(12) United States Patent
Leblanc

(10) Patent No.: US 9,881,700 B2
(45) Date of Patent: Jan. 30, 2018

(54) MOLTEN SALT NUCLEAR REACTOR

(75) Inventor: David Leblanc, Ottawa (CA)

(73) Assignee: Ottawa Valley Research Associates Ltd., Ottawa (CA)

(*) Notice: Subject to any disclaimer, the term of this patent is extended or adjusted under 35 U.S.C. 154(b) by 510 days.

(21) Appl. No.: 14/009,964

(22) PCT Filed: Apr. 5, 2012

(86) PCT No.: PCT/CA2012/050218
§ 371 (c)(1),
(2), (4) Date: Oct. 4, 2013

(87) PCT Pub. No.: WO2012/135957
PCT Pub. Date: Oct. 11, 2012

(65) Prior Publication Data
US 2014/0023172 A1    Jan. 23, 2014

Related U.S. Application Data

(60) Provisional application No. 61/472,388, filed on Apr. 6, 2011.

(51) Int. Cl.
G21C 1/22   (2006.01)
G21C 1/03   (2006.01)
G21C 5/12   (2006.01)
G21C 5/14   (2006.01)
G21C 5/18   (2006.01)
G21C 1/02   (2006.01)
G21C 3/54   (2006.01)

(52) U.S. Cl.
CPC .............. *G21C 1/22* (2013.01); *G21C 1/022* (2013.01); *G21C 1/03* (2013.01); *G21C 5/12* (2013.01); *G21C 5/14* (2013.01); *G21C 5/18* (2013.01); *G21C 3/54* (2013.01); *Y02E 30/34* (2013.01); *Y02E 30/35* (2013.01)

(58) Field of Classification Search
CPC ................................... G21C 3/54; G21C 3/24
USPC ......................................................... 376/359
See application file for complete search history.

(56) References Cited

U.S. PATENT DOCUMENTS

| | | | | |
|---|---|---|---|---|
| 3,018,239 A | * | 1/1962 | Happell | G21C 1/24 376/172 |
| 4,045,286 A | * | 8/1977 | Blum | G21C 1/03 376/288 |
| 4,327,443 A | | 4/1982 | Cotton | |

FOREIGN PATENT DOCUMENTS

GB    843681    8/1960

* cited by examiner

*Primary Examiner* — Sean P Burke
(74) *Attorney, Agent, or Firm* — Louis B. Allard; Borden Ladner Gervais LLP

(57) ABSTRACT

A Single Fluid Reactor with an inner zone that includes a solid neutron moderator, which can have through holes defined therein. This solid neutron moderator can have a relatively small diameter, which can range, in some embodiments, from less than one meter to about 1.5 meter. The solid neutron moderator effectively creates an inner zone with a neutron profile that is far more thermalized than if the solid neutron moderator were absent. The surrounding layer of salt surrounding this inner zone has a much harder neutron spectrum.

18 Claims, 9 Drawing Sheets

MOLTEN SALT NUCLEAR REACTOR

CROSS-REFERENCE TO RELATED APPLICATIONS

This application is a National Stage of International Application No. PCT/CA2012/050218 filed Apr. 5, 2012, which claims the benefit of priority of U.S. Provisional Patent Application No. 61/472,388 filed Apr. 6, 2011. PCT/CA2012/050218 and 61/472,388 are incorporated herein by reference, in their entirety.

FIELD

The present disclosure relates generally to nuclear reactors. More particularly, the present disclosure relates to molten salt nuclear reactors.

BACKGROUND

Molten Salt Nuclear reactors have been proposed in several different forms but two main areas differentiate their use. First is how the fissile and fertile materials are carried. Second is whether extra bulk moderator is employed (graphite is typically specified). The first factor sees three potential designs, which are described below.

Single Fluid reactor design: One single salt that contains both fertile (e.g., thorium and/or U238) and fissile material (e.g., U233 and/or Pu239, U235 etc). The benefit of this mode of operation is that typically, the core design is quite simple. The drawbacks include: (1) difficult fission product removal chemistry (as thorium is chemically virtually identical to rare earth fission products) and (2) possibility of a large leakage of neutrons which both lowers the potential breeding ratio and may cause neutron induced damage on the reactor vessel. Examples of single fluid reactors include the circa 1970 Molten Salt Breeder Reactor (MSBR) of Oak Ridge National Laboratories (ORNL) and MOSART of Russia.

Two Fluid reactor design: There are separate carrier salts for the fertile (typically thorium) and fissile material (typically U233). The two main benefits are simpler fission product removal chemistry and greatly reduced leakage of neutrons since they are absorbed in the surrounding fertile blanket. The main drawbacks are: (1) a potentially more complex core, (2) the need for a barrier material between the two salts that can retain strength in a strong neutron flux, and (3) somewhat decreased proliferation resistance understood by those trained in the field since a "blanket" is employed. As an example, a two fluid reactor design was studied by ORNL from 1960 to 1968.

1 and ½ Fluid reactor design (one and a half fluid reactor design): A hybrid design in which a central fuel salt containing both fertile and fissile material is surrounded by a fertile only blanket salt. This has the advantage of decreased leakage of neutrons but fission product removal remains difficult and there is still a barrier material needed between the central region and the blanket region, albeit potentially in a weaker neutron flux than the Two Fluid design. There is also the blanket salt proliferation issue. Examples include ORNL 1954 to 1960, and the French TMSR/MSFR 2005 to present.

In the prior art, the use of a bulk moderator throughout the core (neutron moderator material formed throughout the volume of the nuclear core) can affect reactor design in many ways. Graphite has been by far the most commonly proposed moderator in the core but clad beryllium and/or heavy water has also been investigated. The main effect of having a moderator is a softening of the neutron spectrum, which can allow operation with far less fissile material. A second very important ability enabled by the use of bulk moderator is that it limits neutron leakage by a method referred to as an under moderated outer zone, which is described below.

A Single Fluid design has the drawback that significant numbers of neutrons can be lost to leakage and these same neutrons can damage the outer vessel (typically a nickel alloy such as Hastelloy N). Adding reflector material between the core and vessel wall (i.e., adding a graphite lining to the vessel wall) has only a limited effect as would be understood by workers in the field.

With graphite or other moderator throughout the core, Oak Ridge National Labs proposed an under moderated outer zone in the mid 1960s. They first calculated the ideal ratio of fuel salt to graphite for an infinite core (i.e., no worry of leakage). This led to a specific neutron spectrum, softened by the graphite, which implies that a particular ratio of fertile (typically thorium) to fissile (typically U233) will make the reactor critical. This salt to graphite ratio (typically about 13% salt in most ORNL work) is employed only for the central core. In a thin outer zone (typically about a meter or less in thickness) they used a much higher ratio of salt to graphite (37% in ORNL work). This results in a harder neutron spectrum in this zone and, as would be understood by workers in the field, leads to a much greater absorption of neutrons in the fertile (thorium) versus production in fissile (U233). For an example, see Nuclear Applications & Technology, Vol. 8, February 1970, page 210, FIG. 1. In reactor physics terms this means the inner core has a K infinity of greater than one (net producers of neutrons) while the outer zone has K infinity much less than one (net absorber). The overall combination is a K effective of just over 1.0 as required to maintain criticality.

Three cases relating to an unreflected core, a reflected core and a core with an under moderated outer zone core are shown in FIGS. 1 and 2, which are meant only to show differences in neutron flux profiles for different types of single fluid reactors. In FIG. 1, plot 1 shows the neutron flux for a single fluid molten salt nuclear core being free of any neutron reflector at the periphery of the nuclear core vessel (i.e., in the absence of reflector 4), and plot 2 shows the neutron flux for a nuclear core having a 40 cm-thick neutron reflector 4 at the periphery of the nuclear core vessel. Also shown at FIG. 1 is a wall 3 of the reflector 4. FIG. 2 shows a neutron flux plot 5 (neutron flux profile) for a single fluid molten salt reactor core without a reflector but with an under moderated outer zone 6. As shown in FIG. 2, the neutron flux at the outer periphery (~200 cm) is greatly reduced in comparison to the unreflected "bare core" plot 1 of FIG. 1.

There are significant drawbacks to using bulk graphite or other moderators (clad beryllium, heavy water). For example, graphite is known to have a limited lifetime in the core which has forced designers to either propose very low power density and thus very large cores or to plan for periodic graphite replacement which is a difficult challenge. As well, the overall safety of Molten Salt Reactors is outstanding but the potential fire hazard of graphite cannot be ignored. Finally graphite use represents a significant disposal. With clad beryllium used throughout the core, the losses of neutrons to the cladding are excessive.

Thus it has long been a desire to be able to design a practical Single Fluid reactor that does not employ bulk moderators such as graphite. However, without an under moderated outer zone, the issue of neutron leakage and damage to the outer vessel have always curtailed these efforts. As well, the less moderated neutron spectrum means a shorter prompt neutron lifetime which has negative implications on reactor control as would be known by those trained in the field. As an example, in the MOSART design of Russia which is a Single Fluid transuranic waste burner, they felt the need to propose two thick layers, a layer of graphite facing the salt to slow neutrons down and reflect some neutrons and then of steel blocks to absorb the unreflected neutrons. This 20 tonne liner of graphite would still require periodic replacement which limits the design's utility. Finally, as would be known by those trained in the art, a graphite reflector can in many cases actually increase the overall leakage of neutrons due to a fission power peaking from more thermalized neutrons re-entering the core salt from the graphite reflector.

Therefore, improvements in molten salt nuclear reactors are desirable.

SUMMARY

In a first aspect, the present disclosure provides a single fluid molten salt nuclear reactor that comprises: a vessel having a central region and a vessel wall; a support structure; a neutron moderator secured to the support structure and located in the central region of the vessel, the neutron moderator having at least one through hole defined therein; and a pump to circulate a molten salt in the vessel, the support structure, the neutron moderator, and the pump being arranged to circulate the molten salt through the at least one through hole of the neutron moderator and between the neutron moderator and the vessel wall.

In a second aspect, the present disclosure provides a single fluid molten salt nuclear reactor that comprises: a vessel having a central region and a vessel wall; two opposite walls disposed at opposite ends of the vessel; a support structure; a neutron moderator secured to the support structure and located in the central region of the vessel; a molten salt inlet formed on one of the two opposite walls; a molten outlet formed on the other of the two opposite walls; and a pump operationally connected to the molten salt inlet and to the molten salt outlet, the pump to circulate a molten salt in the vessel.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The present disclosure provides an improved Single Fluid Molten Salt Nuclear Reactor (also referred to as a Single Fluid Reactor). In some embodiments, the core diameter of the Single Fluid Reactor can range from 2 to 4 meters. The Single Fluid Reactor has an inner zone that includes a solid neutron moderator, which can have salt coolant channels (through holes) defined therein. In some embodiments, the solid neutron moderator can be replaced when required. This solid neutron moderator can have a relatively small diameter, which can range, in some embodiments, from less than one meter to about 1.5 meter. The solid neutron moderator effectively creates an inner zone with a neutron spectrum (profile) that is far more thermalized than if the solid neutron moderator were absent. The surrounding layer of salt surrounding this modest sized inner zone (the inner zone can also be referred to as a central zone) will have a much harder neutron spectrum. The inner zone to which the present disclosure refers is the volume of the solid neutron moderator plus the volume of any through holes or apertures defined by the solid neutron moderator. By choosing a single fuel salt with an appropriate ratio of fertile (e.g., thorium or U238) to fissile (e.g., U233, U235, or Pu) one can assure that the inner zone has a k infinity of much greater than 1.0 and the outer layer of pure salt a K infinity of less than 1.0, and that overall the k effective is the needed value of just over 1.0 as would be understood by a worker skilled in the art.

Figure 1:
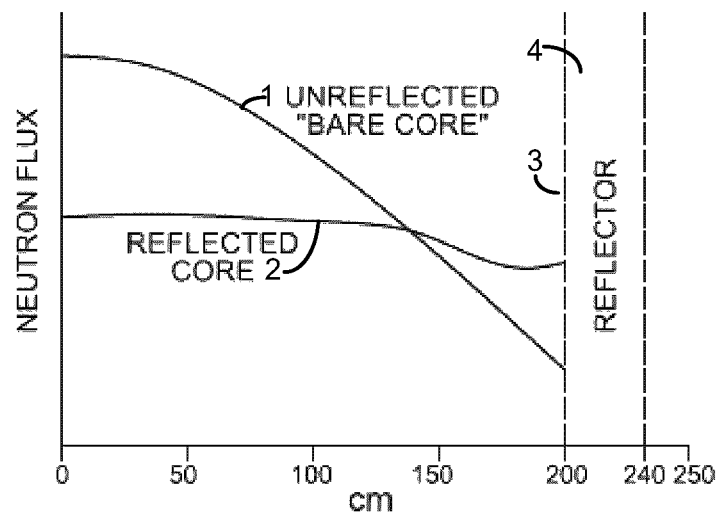
FIG. 1 shows plots of neutron flux as a function of distance from the core for a reflected core and for an unreflected core.
Figure 2:
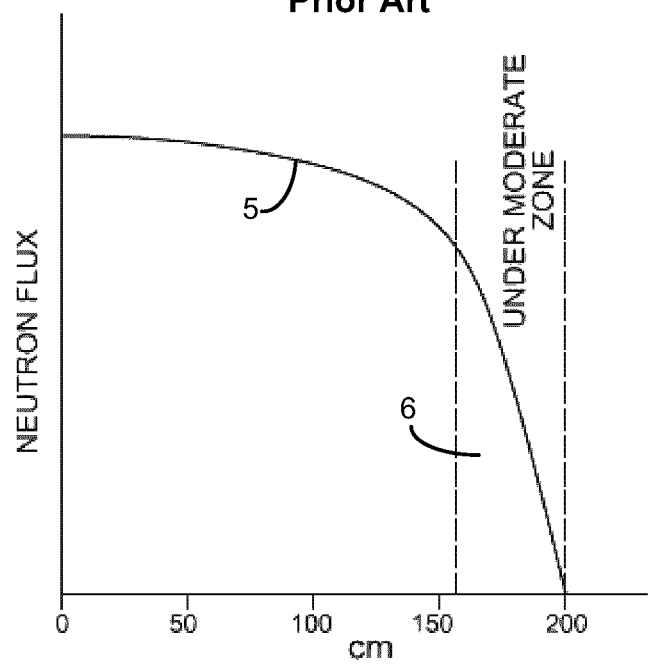
FIG. 2 shows a plot of neutron flux as a function of distance from the core for a reactor having an under-moderated zone.
Figure 3:
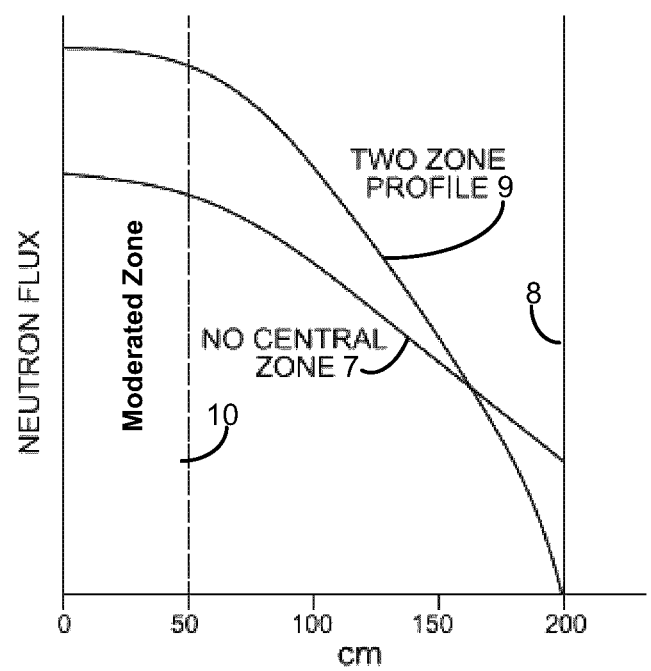
FIG. 3 shows plots of neutron flux as a function of distance form the core for a molten salt nuclear reactor having a moderated central zone and for the same molten salt nuclear reactor without the moderated zone.

FIG. 3 shows two plots of the neutron flux for a Single Fluid Reactor. Plot 7, labeled "no central zone", is when no central moderated zone (no neutron moderator at the central region) is present in the Single Fluid Reactor. As shown by plot 7, in this situation there is still significant neutron flux at the outer edge of the core which is the vessel wall 8. The neutron flux at the wall 8 can lead to potential damage and to loss of neutrons to leakage. Plot 9, labeled "Two Zone Profile", is with the central moderated zone 10 present and, as the outer zone (the zone outside the moderated zone 10) is under-moderated this leads to a much more rapid decline in the neutron flux and effectively a much lower neutron flux at the outer vessel wall. Plot 9 shows that a Single Fluid Reactor, in accordance with the present disclosure, can lead to significantly less damage at the wall 8 of the vessel containing the fuel salt.

Figure 4:
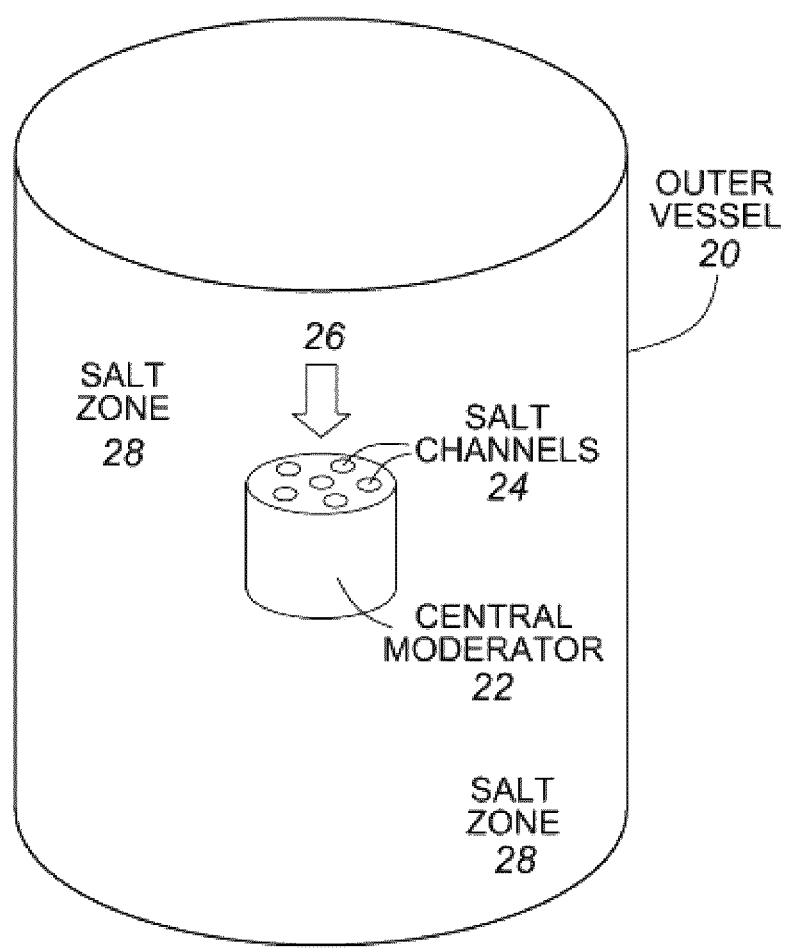
FIG. 4 shows a generalized embodiment of a Single Fluid Molten Salt Nuclear Reactor of the present disclosure.

FIG. 4 shows a generalized depiction of an embodiment of a Single Fluid Reactor of the present disclosure. The Single Fluid Reactor includes an outer vessel 20, a central moderator 22 that defines through holes 24 (salt channels) to allow passage of molten salt (fertile/fissile salt) therethrough. The molten salt traverses the channels 24 in the direction of the arrow 26. The volume comprised between the central moderator 22 and the outer vessel 20 includes a salt zone 28, free of bulk solid moderator, in which the fissile/fertile salt also flows in the direction of the arrow 26. For clarity purposes, FIG. 4 does not show entry and exit ports for the salt, or other ancillary elements.

The presence of the central neutron moderator 22 can result in a similar under moderated outer zone like the 1970 single fluid MSBR and will result in the salt zone 28 being a net absorber of neutrons (more absorbed by the fertile elements (Th and/or U238) versus produced by the fissile elements (U233, Pu239 etc). As a result, the power and neutron flux distribution should follow that shown in plot 9 of FIG. 3 and lead to a greatly reduced leakage of neutrons and reduced neutron induced damage to the outer vessel wall. As will be understood by the skilled worker, the dimensions of the vessel and of the neutron moderator can be determined in accordance with constituents of the molten salt to maintain a flux of neutrons at the vessel wall below a pre-determined neutron flux, such as to avoid damage to the vessel wall.

This reduced neutron flux at the wall (periphery) of the outer vessel 20 resulting from the present disclosure will allow a practical reactor without a graphite reflector. This significantly reduces the complexity of design and operation as there is not any graphite liner replacement required. Further, as there are essentially no neutrons reflected (there is no graphite reflector), there is no issue of power peaking due to the graphite reflector thermalizing neutrons. Having a simple steel liner as a reflector/absorber before the final outer vessel wall is optional. The reduced neutron flux at the wall (periphery) also means far fewer neutrons lost to leakage and a resultant improvement in the conversion and/or breeding ratio.

This reduced neutron flux at the outer periphery of the reactor core (reduced neutron flux at the wall of the vessel 20) can have a significant benefit on reactor control. As is known in the art, if a reactor has a mix of thermal and fast fissions, with at least 5% of fissions coming from the thermal spectrum, then these reactions that stem from the thermal spectrum, with their longer prompt neutron lifetime, will regulate the reactor, which improves reactor control.

Different embodiments beyond the above generalized depiction of FIG. 4 are described below.

Figure 5:
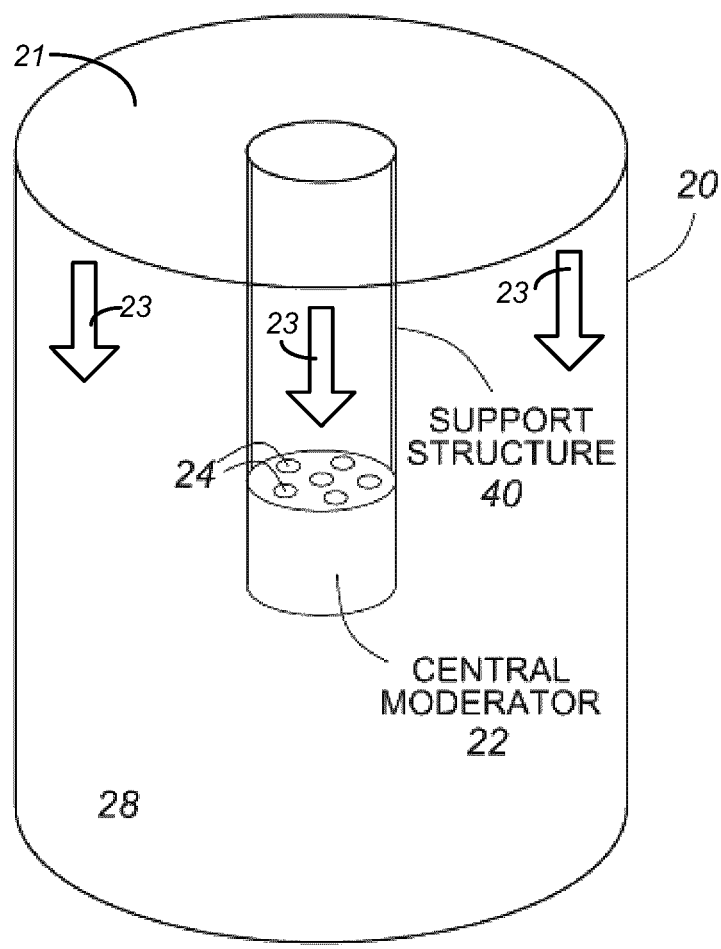
FIG. 5 shows an embodiment of a Single Fluid Molten Salt Nuclear Reactor of the present disclosure that includes a support structure.

Another embodiment of the present invention is shown in FIG. 5, where a rigid support structure 40 that is connected to, and extends down from, the top 21 of the outer vessel 20. The embodiment of FIG. 5 addresses the physical stability of the central zone, which includes the central moderator 22. The rigid support structure 40 can be made of material that includes, but is not limited to, graphite, molybdenum or Hastelloy N. In addition to being supported at the top of the outer vessel 20, the rigid support structure 40 can also be connected to any other suitable portion of the outer vessel to ensure that the central moderator 22 inserted in the support structure 40 does not move with respect to the outer vessel 20. Any suitable connection means between the outer vessel 20 and the support structure are within the scope of the present disclosure. Although not shown in FIG. 5, the rigid support structure 40 can have openings defined therein to allow passage of molten salt through the rigid support structure and through the central moderator 22. In FIG. 5, the salt flow from the top 21 of the vessel, in the direction indicated by arrows 23.

Figure 6:
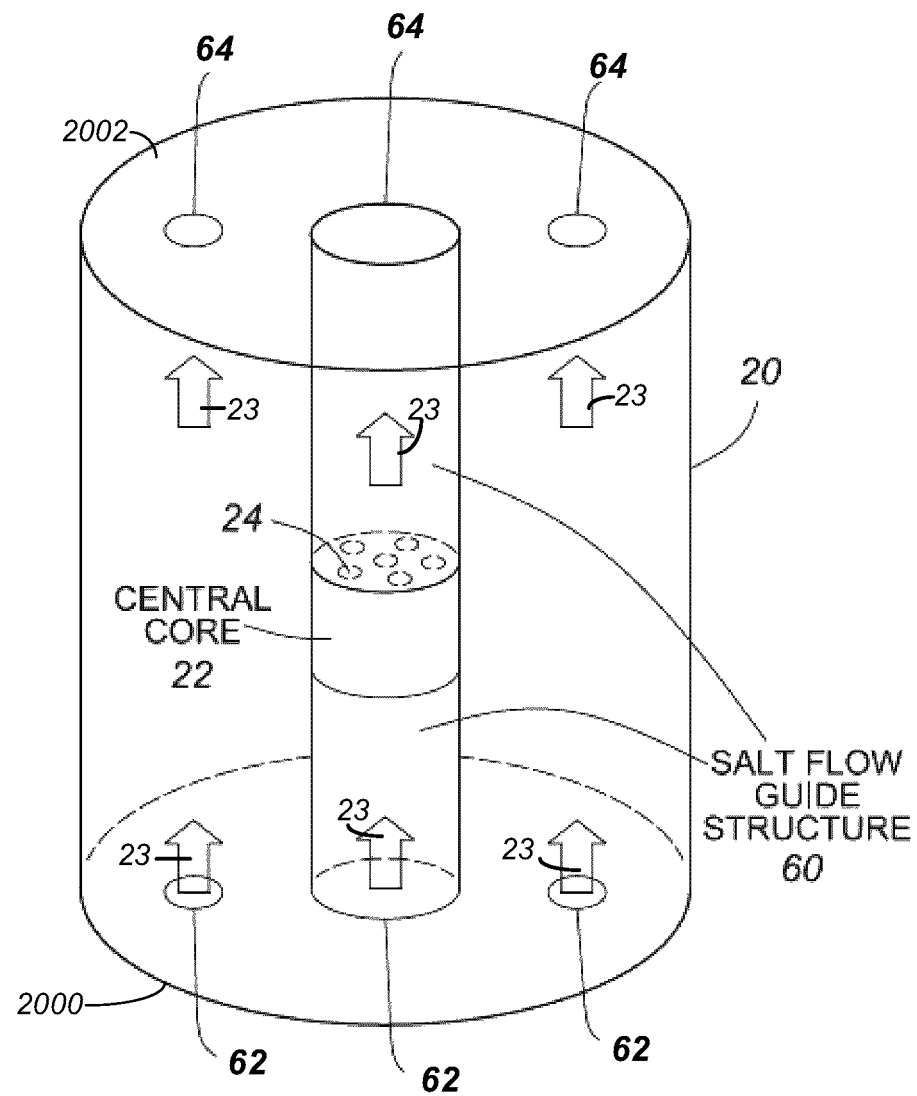
FIG. 6 shows an embodiment of a Single Fluid Molten Salt Nuclear Reactor of the present disclosure that includes a salt flow guide structure.

In the embodiment of FIG. 5, the flow of salt through the through holes 24 of the central moderator 22 will be limited as most salt will follow the path of least resistance around the core. However, it can be advantageous to physically direct a greater volume of salt flow in the direction of the central moderator 22 and its through holes 24. The embodiment of the present disclosure shown at FIG. 6 addresses this issue. To direct a higher salt flow through the central moderator 22, a salt flow guide structure 60 can be used. The salt flow guide structure 60 can be tube shaped (cylinder shaped) and can extend from the bottom (bottom wall 2000) to the top (top wall 2002, opposite the bottom wall) of the outer vessel 20 (the bottom wall and top wall are disposed at opposite ends of the vessel 20). The outer vessel 20 has salt inlet ports 62 that can be configured (sized) to force a higher relative percentage of salt through the salt flow guide structure 60 and through the central moderator 22. Although not shown in FIG. 6, the salt inlet ports 62 are connected to a pump system that pumps a molten fuel salt through the salt inlet ports 62. The pump system can be arranged to have a different pump rate for different salt inlet ports 62. The fuel salt having entered by the inlet ports 62 leaves the outer vessel 20 through salt exit ports 64 to then travel on to the primary heat exchangers (not shown). The salt flow guide structure 60 can include, for example, a simple tube of graphite itself or Molybdenum and/or Molybdenum alloy such as TZM or Hastelloy N. Arrows 23 indicate the direction of molten salt flow. In some embodiments, the salt flow guide structure 60 can also be used as a guide for control rod or rods (an option not depicted). Control or shutdown rods are often considered optional but this new core feature may allow them to function practically. As would be understood by a skilled worker, control rods have much greater net worth in a softer neutron spectrum and are a challenge to provide enough neutron absorption for faster neutron spectrums. In the case of the present disclosure, a control rod can be inserted into the central core zone where the spectrum is softer or more thermalized.

Figure 7:
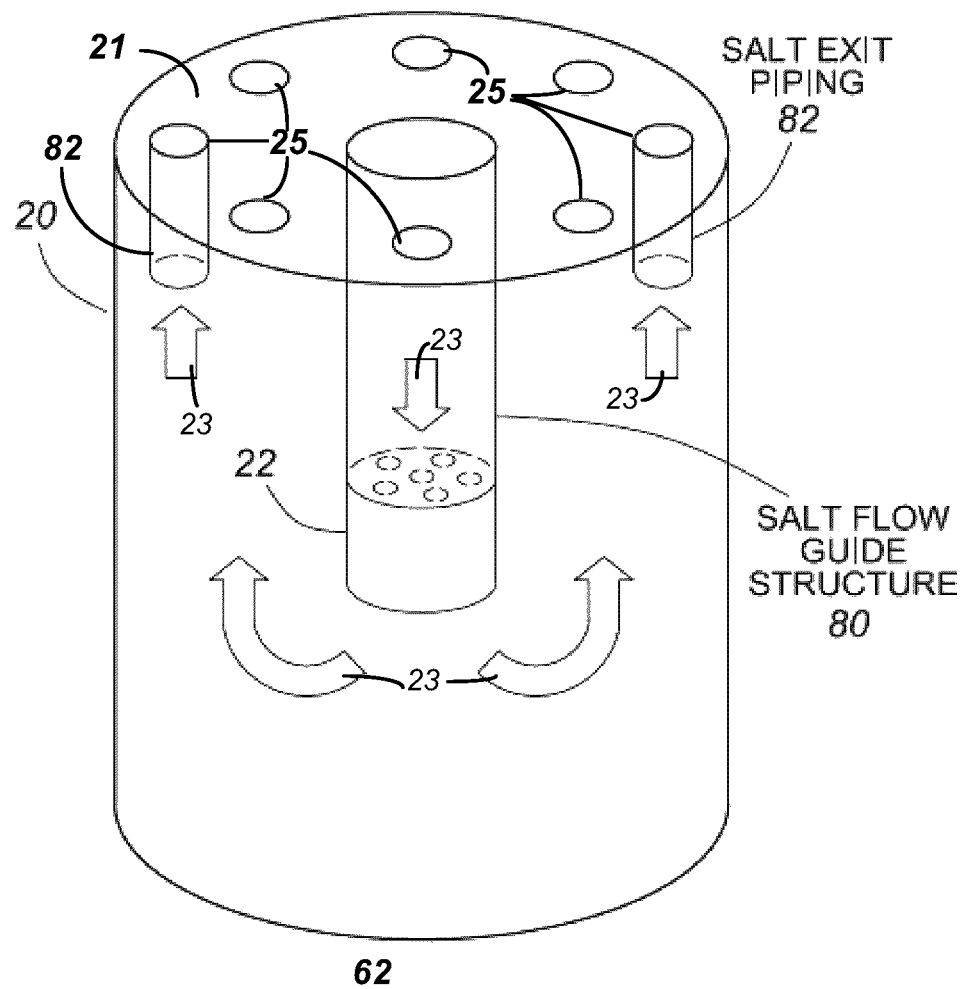
FIG. 7 shows another embodiment of a Single Fluid Molten Salt Nuclear Reactor of the present disclosure.

Another embodiment of the present disclosure is shown at FIG. 7, which shows salt entry and exit being accomplished from the top 21 of the outer vessel 20. The incoming cooler salt enters the reactor core through a salt flow guide structure 80 leading to the central core after which the salt loops back to exit tubes (salt exit piping 82) on the top of the vessel, for example, adjacent the periphery of the outer vessel 20. The now hotter fuel salt exits the reactor core through salt exit piping 82 and apertures 25, and travels to the primary heat exchanger (not depicted). Although not shown in the Figure, salt exit piping 82 can be present at all apertures 25. The molten salt flow direction is indicated by arrows 23. Although not shown, the flow direction of the molten salt could be reversed from that shown in FIG. 7. That is, the molten salt could enter from piping 82 (in this embodiment the piping would be referred to as salt inlet piping) and exit through the guide structure 80. Regardless of the flow direction of the molten salt, in the embodiment of FIG. 7, the molten salt circulates through the holes of the central moderator 22 (neutron moderator) and between the central moderator and the vessel wall of the vessel 20.

Another embodiment to discuss is the moderator itself. Graphite is a possible choice of material for the central moderator 22. Graphite is known to expand beyond its original dimensions after a certain amount of fast neutron flux. Such expansion may prove allowable although in some cases, a graphite central moderator will require periodic replacement. The small size of the central moderator 22 can facilitate this replacement during for example, planned shutdowns for general maintenance or inspection. Alternatively, Beryllium compounds such as, for example, Beryllium Oxide and Beryllium Fluoride, powdered graphite, or any other suitable moderator material could be used within a cladding without departing from the scope of the present disclosure. Cladding could include but not be limited to, Molybdenum, TZM or Hastelloy N. The combination of molybdenum and beryllium compound for example could be such that very long core residency times could be reached as both materials are expected to have a very long potential residency time, potentially a full reactor lifetime of 30 to 60 years. The support structure 40 (FIG. 5), the guide structure 60 (FIG. 6), and the guide structure 80 (FIG. 7) can also be made from the same list of potential cladding materials. As any cladding or support structure is only a minor fraction of the overall core, the neutron losses to this material should not be significant and there is the option of using isotopically enriched materials to further reduce losses as would be understood by someone trained in the art.

Figure 8:
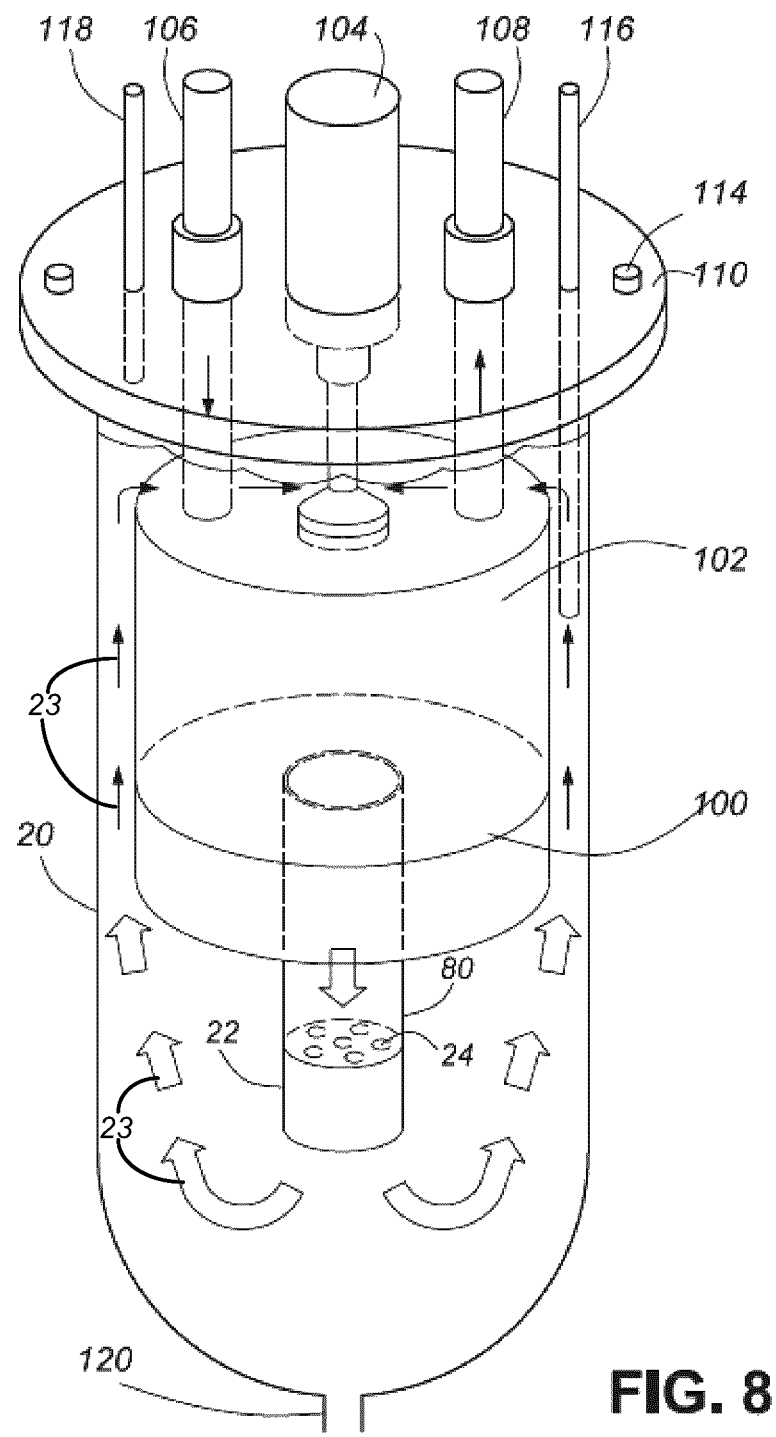
FIG. 8 shows yet another embodiment of a Single Fluid Molten Salt Nuclear Reactor of the present disclosure.

The embodiments shown at FIGS. 4, 5, 6 and 7 are meant as generalized depictions uncomplicated by the associated components needed outside the reactor core. FIG. 8 represents another embodiment showing a more detailed system.

The bottom portion of FIG. 8 is similar to the generalized depiction of FIG. 7. The central moderator 22 is held in place by the salt flow guide structure 80, which passes through an aperture in a top reflector 100 that connects to the output of the primary heat exchanger (PHX) 102. The top reflector 100 can limit or prevent neutrons from reaching the primary heat exchanger. As an example, stainless steel 316 SS can be used as a material for the top reflector 100. The PHX 102 can be, but is not limited to, a tube within shell heat exchanger. The salt is driven through the PHX 102 by a main pump 104. The fuel salt thus travels through the PHX 102, through the salt flow guide structure 80, through the central moderator 22, and then loops back along the periphery of the outer vessel 20 outside the PHX 102 to just above the PHX where it is then pumped back through the PHX 102. The molten salt flow direction is indicated by arrows 23.

The outer vessel 20 is connected to a reactor lid 110 by connecting bolts 114. Inlet coolant salts enter through piping 106 to the PHX 102 and then exit through piping 108. This coolant salt delivers the usable heat to an Intermediate Heat Exchanger (not depicted) which heats a turbine working media (Steam, He, Supercritical CO2, N2, Air etc). Small extra penetrations include helium gas bubbling tube(s) 116 and exit plenum gas tube(s) 118. As understood by those in the field, this system is to help remove fission gases Xenon and Krypton along with other volatile and noble fission products. Finally, at the bottom of the core is a drain line 120 leading to a freeze plug and decay heat tanks as is standard in molten salt reactor design. Although not shown, the main pump 104 could be arranged such that the flow direction of the molten salt could be reversed from that shown in FIG. 8. In the embodiment of FIG. 8, the guide structure 80, the central moderator 22, and the main pump 104 are arranged to circulate the molten salt through the through holes of the central moderator 22 and between the central moderator 22 and the vessel wall of the vessel 20.

In the embodiments presented herein, the guide structures 60 and 80 can also be referred to as support and guide structures, as they also support the central moderator 22. The support structure 40 of FIG. 5 can also be referred to as a support and guide structure, as is also guides molten salt towards the central moderator 22.

In the embodiments presented herein, the central moderator is shown as being cylindrical with cylindrical through holes parallel to the height of the cylinder. However, as will be understood by the skilled worker, any other suitable shape of central moderator and through holes is also within the scope of the present disclosure. Further, even though the central moderators depicted herein define through holes, this need not be the case.

To give examples of sizes, the entire reactor vessel may be some 7.5 meters in height and 3.5 meters in diameter. The central moderator 22 can have a diameter of the order of one meter. The top reflector 100 can have 50 cm of thickness and the PHX 102 can be 3 meters tall and 3 meters in diameter. Such a PHX 102 could provide approximately 21 cubic meters of heat exchanger and adequate for 2250 MWth and thus roughly 1000 MWe. The active fuel salt volume in the lower core region would be a cylinder roughly 3.5 m high and 3.5 m in diameter or roughly 34 cubic meters. A further 16 cubic meters of fuel salt may be found in the outer periphery around the PHX 102, the top collection plenum and within the PHX 102. A total salt volume of 50 cubic meters gives a quite conservative power density within the core (other prior art ranged from a fuel salt volumes of 15 to 100 cubic meters per 1000 MWe).

The advantages of this integrated system include the fact that the entire primary fuel loop is within the primary reactor vessel. After disconnecting coolant salt entry 106 and exit 108 piping and unfastening the bolted 114 reactor lid 110, the entire assembly of pump, PHX, reflector, guide structure and inner core can be removed for inspection and/or maintenance by an overhead crane (not depicted). Again, as a reminder, without the central moderator 22 modifying the neutron flux profile and greatly lowering the neutron flux at the outer vessel wall 20 and internal reflector 100 such a reactor could not expect any significant lifetime out of the Hastelloy N components. As well, leakage of neutrons would both greatly lower the conversion or breeding ratio. As such, the present disclosure provides a practical Single Fluid Molten Salt Nuclear Reactor without any bulk moderator material.

The following presents modeling results of embodiments of the present disclosure. The modeling was done using Monte-Carlo N-Particle (MNCP) code. The modeling was focused on systems with U235 as the primary fissile (as it would be a likely startup fissile material) and U238 as the primary fertile material. The modeled reactor geometry shown is that of FIG. 9.

Figure 9:
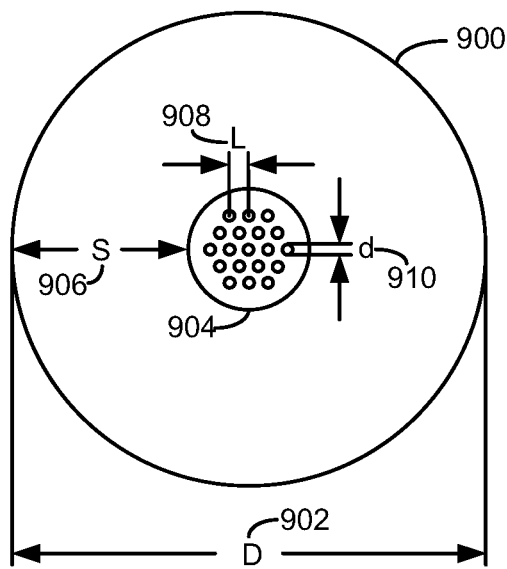
FIG. 9 shows a top down view of an embodiment of the present disclosure used in modeling.

FIG. 9 shows a top down view that shows the outer reactor vessel wall 900 of diameter D 902 and having a central moderator 904 with salt flow channels (through holes) of diameter d 910 and pitch L 908. The central moderator zone being a distance S 906 from the outer vessel wall with the space between being filled with fuel salt.

Figure 10:
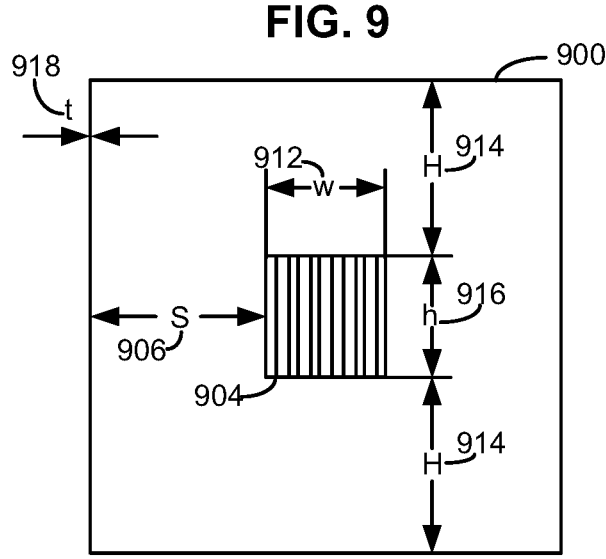
FIG. 10 shows a side view of the embodiment of FIG. 9.

FIG. 10 shows a side view of the system modeled. The outer vessel wall 900 has a thickness t 918. The inner moderator core 904 has a width w 912 and a height h 916 and is centered such that the distance H 914 from the top and bottom of the vessel are the same.

Figure 11:
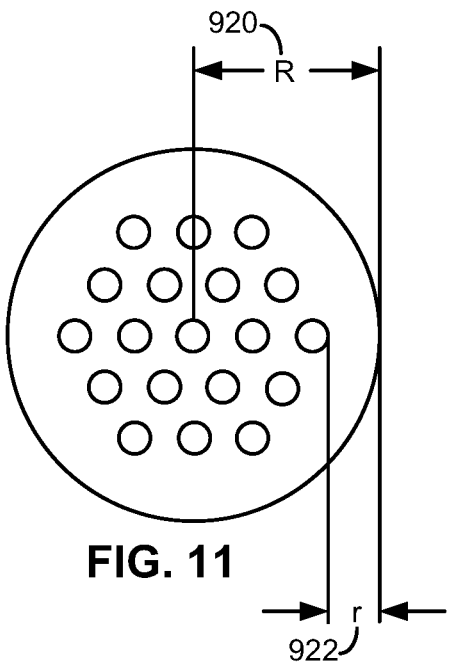
FIG. 11 shows a top down view of the central core shown at FIG. 9.

FIG. 11 shows a top down view of the moderator core itself which has a radius R 920 and a minimum spacing r 922 from the outer most salt channel to the outside of the moderator core.

For initial modeling runs a wall thickness t 918 of 1 cm of Hastelloy N (high nickel alloy) is used and the reactor vessel 904 is a right cylinder of 4 meters inside diameter and 4 meters in height. Several diameters and heights of the inner moderator zone 904 have been modeled, all with the same arrangement of nineteen salt channels with a 20 cm pitch L. For simulation purposes, the diameter W and height h have been kept equal and values of 1 meter, 1.5 meter and 2.0 meters have been modeled. Nuclear grade graphite is assumed for these models and a temperature of about 650° C. assumed for the molten salt temperature.

As discussed below, the modeling of embodiments of the present disclosure shows an increased benefit from the fast neutrons and, a decrease of neutron flux at the vessel wall. Modeling results also indicate that, in some cases, a low ratio of fissile to fertile material can achieve criticality. This is especially important when starting reactors on Low Enriched Uranium where up to 20% U235 enrichment is possible on proliferation grounds but above 5% enrichment is more difficult to obtain commercially. Results of three modeling runs are as follow.

The first modeling run involved a simple 1 meter diameter (w 912, FIG. 10) by 1 meter high (h 916, FIG. 10) cylindrical graphite core with 19 channels of 10 cm diameter d (910, FIG. 9), a minimum spacing r (922, FIG. 11) of 5 cm, and a pitch L (908, FIG. 10) for a salt flow giving a salt to graphite ratio of approximately 19% in the central core. Fuel salt was a 73% LiF-27% UF4 eutectic with a 470° C. melting point. Just under 12% U235 enrichment was required to be critical. This initial modeling attempt was not ideal as the calculated (modeled) leakage of neutrons was still relatively high at 4% but this is already a large improvement over what would be expected without the central core. The modeling results included a very large fast fission bonus from U238 of 7.23% of all fissions. As well, parasitic losses of neutrons to the enriched lithium (0.09%), fluorine (1.2%), carbon atoms (0.04%) and the outer vessel wall were very low, totaling 1.4% of absorptions. Just over 5% of fissions came from neutrons of thermal energy (below 0.625 eV).

In a second modeling run, the same inner core arrangement of 19 fuel salt channels was used as in the first modeling run described above. That is, the interspacing (or pitch L 908) of the through holes and the diameter of the through holes was unchanged. However, the diameter w and the height h of the moderator core 904 were increased to 2 meters each, and the minimum spacing r (922, FIG. 11) was increased to 55 cm.

The results of this second modeling run show quite high losses to graphite (3.4%) which is not surprising as the pure graphite radial layer is 55 cm thick. The results of the second modeling run also show a lowering of losses to neutron leakage to 1.0% as well as having a surprisingly low requirement of U235 enrichment of only 3.2% (lower than current light water reactors). Most fissions in the second modeling run were thermal (68%) and the fast fission bonus dropped to 5.2%.

In a third modeling run, the same inner core arrangement of 19 fuel salt channels was used as in the first and second modeling runs described above. That is, the interspacing of the through holes and the diameter of the through holes was unchanged. However, the diameter w and the height h of the moderator core 904 were set to 1.5 meter each, and the minimum spacing r (922, FIG. 11) was set to 30 cm. The modeling results show a somewhat higher U235 enrichment (4.44%) than in the second modeling run, a 5.63% U238 fast fission bonus, losses to graphite of 1.2% and neutron leakage of only 0.74% of neutrons (lower than any molten salt reactor design work of ORNL, even including their Two Fluid studies which had 0.8% lost to neutron leakage and reflector loses, (e.g., see ORNL 4528)).

Figure 12:
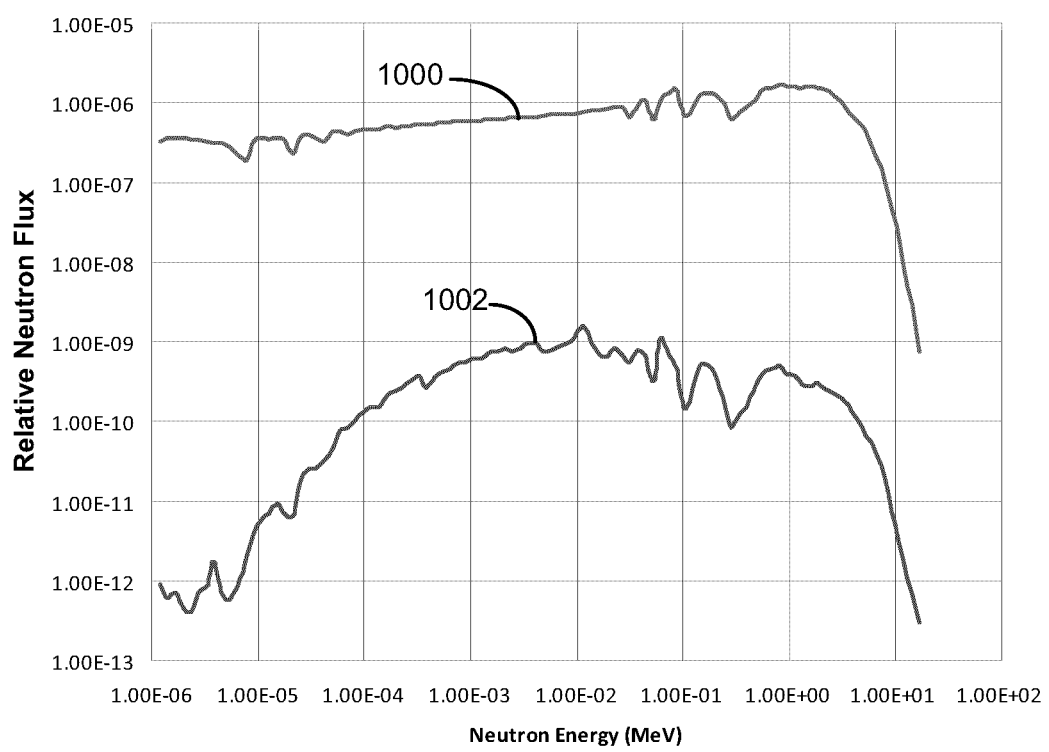
FIG. 12 shows plots of relative neutron flux as a function of energy.

FIG. 12 shows plots of relative neutron flux as a function of neutron energy, the plots resulting from the third modeling run described above. Plot 1000 represent the aforementioned flux at the center of the central moderator 904 and the plot 1002 represents the neutron flux at the wall of the nuclear reactor. As evidenced by FIG. 12, there is a decrease in relative neutron flux from the center to the outer periphery (wall) as it drops by 3 to 4 orders of magnitude.

These combinations of very low parasitic losses and substantial U238 fast fission bonus result in an initial conversion ratio of 0.90 which is much higher than the initial ratio of roughly 0.80 that ORNL modeled for the denatured molten salt reactor (DMSR) described in ORNL TM 7207 that started on a mix of 20% LEU and thorium but with bulk graphite throughout the core. As well, there was almost no fast fission bonus of U238 in the DMSR study. Thermal fissions accounted for 55% of all fissions.

For the 1.5 m by 1.5 meter third modeling run, comparing parasitic absorptions to other reactors (not including fission products or nonfertile and nonfissile actinides such as U236 and Np237) there is a total of just over 3% loses. Compared to this is 4.8% in the DMSR (ORNL TM 7207) and 5.5% in the MSBR (ORNL 4541). Much higher of course are conventional reactors with 11.7% in heavy water CANDUs and roughly 22% in Light Water Reactors. The latter reactors are predominantly in control poisons not required in MSR designs.

The most recent modeling returned to the small 1 m diameter w by 1 m high h core but changed to smaller channel diameter d of 8 cm. The higher ratio of graphite to fuel salt had the desired effect of increasing the k inf in the inner core and greatly decreasing neutron leakage from the vessel while retaining more benefits of the fast spectrum. For criticality the needed enrichment of U235 was 9.9%. The leakage was a very low 0.66% and reactor vessel wall absorptions only 0.14% (with now a more practical wall thickness t of 5 cm). Carbon absorptions were only 0.12% and total parasitic absorptions the lowest to date at 2.4%. The fast fission bonus remained a very high 7.1% of all fissions.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

What is claimed is:

1. A single fluid molten salt nuclear reactor comprising:
a vessel having a central region and a vessel wall, a vessel height and a vessel width;
a support structure;
a neutron moderator secured to the support structure and located in the central region of the vessel, the neutron moderator having a neutron moderator height and a neutron moderator width, the vessel height being greater than the neutron moderator height by a factor comprised between two and four, the vessel width being greater than the neutron moderator width by a factor comprised between two and four such that an under-moderated zone is defined between the neutron moderator and the vessel wall, the neutron moderator having at least one through hole defined therein that is in fluid communication with the under-moderated zone; and
a pump to circulate a molten salt in the vessel, the support structure, the neutron moderator, and the pump being arranged to circulate the molten salt through the at least one through hole of the neutron moderator and the under-moderated zone between the neutron moderator and the vessel wall;

wherein a space between the neutron moderator and the vessel wall is free of any neutron reflector.

2. The nuclear reactor of claim 1 wherein the support structure is also a guide structure to guide the molten salt therethrough, the support structure, the neutron moderator, and the pump being arranged to circulate the molten salt first through the support structure, then through the at least one through hole of the neutron moderator, and subsequently between the neutron moderator and the vessel wall.

3. The nuclear reactor of claim 1 wherein the support structure is also a guide structure to guide the molten salt therethrough, the support structure, the neutron moderator, and the pump being arranged to circulate the molten salt first between the neutron moderator and the vessel wall, then through the at least one through hole of the neutron moderator, and subsequently through the guide structure.

4. The nuclear reactor of claim 1 wherein the neutron moderator is a cylinder-shaped neutron moderator, the at least one through hole being parallel to a height of the cylinder-shaped neutron moderator.

5. The nuclear reactor of claim 1 wherein the at least one through hole is perpendicular to the neutron moderator width.

6. The nuclear reactor of claim 1 wherein the vessel has a vessel height and the neutron moderator has a neutron moderator height, the at least one through hole being parallel to the neutron moderator height.

7. A single fluid molten salt nuclear reactor comprising:
a vessel having a central region and a vessel wall, a vessel height and a vessel width;
two opposite walls disposed at opposite ends of the vessel;
a support structure;
a neutron moderator secured to the support structure and located in the central region of the vessel, the neutron moderator having a neutron moderator height and a neutron moderator width, the vessel height being greater than the neutron moderator height by a factor comprised between two and four, the vessel width being greater than the neutron moderator width by a factor comprised between two and four such that an under-moderated zone is defined between the neutron moderator and the vessel wall, the neutron moderator having at least one through hole defined therein that is in fluid communication with the under-moderated zone;
a molten salt inlet formed on one of the two opposite walls;
a molten outlet formed on the other of the two opposite walls; and
a pump operationally connected to the molten salt inlet and to the molten salt outlet, the pump to circulate a molten salt in the vessel, through the at least one through hole of the neutron moderator and the under-moderated zone between the neutron moderator and the vessel wall;
wherein a space between the neutron moderator and the vessel wall is free of any neutron reflector.

8. The nuclear reactor of claim 1 wherein the neutron moderator includes at least one of graphite and of clad beryllium compound.

9. The nuclear reactor of claim 1 wherein the neutron moderator is one of graphite, a clad beryllium compound, and a clad graphite powder.

10. The nuclear reactor of claim 7 wherein the neutron moderator includes at least one of graphite and of clad beryllium compound.

11. The nuclear reactor of claim 7 wherein the neutron moderator is one of graphite, a clad beryllium compound, and a clad graphite powder.

12. A single fluid molten salt nuclear reactor comprising:
a vessel having a central region and a vessel wall, the vessel wall being free of any graphite neutron reflector, the vessel having a vessel height and a vessel width;
a neutron moderator positioned a central region of the vessel, the neutron moderator having a neutron moderator height and a neutron moderator width, the vessel height being greater than the neutron moderator height by a factor comprised between two and four, the vessel width being greater than the neutron moderator width by a factor comprised between two and four such that an under-moderated zone is defined between the neutron moderator and the vessel wall, the neutron moderator having at least one through hole defined therein that is in fluid communication with the under-moderated zone; and
a pump to circulate a molten salt in the vessel, the neutron moderator and the pump being arranged to circulate the molten salt through the at least one through hole of the neutron moderator and the under-moderated zone between the neutron moderator and the vessel wall such that the molten salt in the under-moderated zone reduces a neutron flux at the vessel wall to reduce damage to the vessel wall;
wherein a space between the neutron moderator and the vessel wall is free of any neutron reflector.

13. The nuclear reactor of claim 12 wherein the neutron moderator:
is a graphite neutron moderator,
has a width comprised between one meter and two meters, and
has a height that matches the width of the neutron moderator.

14. The nuclear reactor of claim 12 further comprising a support structure that positions the neutron moderator at the central region of the vessel, the support structure having a conduit portion, the support structure, the neutron moderator, and the pump being configured to circulate the molten salt first through the conduit portion of the support structure, then through the at least one through hole of the neutron moderator, and subsequently between the neutron moderator and the vessel wall.

15. The nuclear reactor of claim 12 wherein the support structure is also a guide structure to guide the molten salt therethrough, the support structure, the neutron moderator, and the pump being arranged to circulate the molten salt first between the neutron moderator and the vessel wall, then through the at least one through hole of the neutron moderator, and subsequently through the guide structure.

16. The nuclear reactor of claim 12 wherein the neutron moderator is a cylinder-shaped neutron moderator, the at least one through hole being parallel to a height of the cylinder-shaped neutron moderator.

17. The nuclear reactor of claim 12 wherein the neutron moderator includes at least one of graphite and of clad beryllium compound.

18. The nuclear reactor of claim 12 wherein the neutron moderator is one of graphite, a clad beryllium compound, and a clad graphite powder.

* * * * *